United States Patent Office

3,022,290
Patented Feb. 20, 1962

3,022,290
PROCAINE PENICILLIN PRODUCTION
Alfred E. Jurist, Brooklyn, N.Y., assignor to Olin Mathieson Chemical Corporation, New York, N.Y., a corporation of Virginia
No Drawing. Filed Dec. 6, 1957, Ser. No. 700,954
5 Claims. (Cl. 260—239.1)

This invention relates to an improved process for the production of penicillin salts; more particularly, it relates to an improved process for the production of procaine penicillin in an advantageous form for use in animal feeds, and the advantageous form thereby produced.

Prior to this invention, crystalline procaine penicillin has been prepared by various methods, but the crystals obtained either have not been of a proper physical form and size so as to retain full potency during blending with the feedstuffs or storage thereof, or it has been difficult to control the production of the desired form and size.

It has now been found that crystals of procaine penicillin of optimal form and size for use in animal feeds can be obtained by a method which is simple and permits easy and accurate control. By way of illustration (and not limitation), the following are characteristics of optimal-sized procaine penicillin crystals: not more than 10% of the crystals are less than 60 microns in size, and not more than 20% exceed 250 microns in size.

The preferred process of this invention essentially comprises the simultaneous, incremental addition of (A) an aqueous solution of urea or a water soluble alkyl urea and an alkali metal penicillin (preferably potassium penicillin) and (B) an aqueous solution of urea or a water soluble alkyl urea and a procaine acid-addition salt (preferably procaine hydrochloride) to (C) a suspension of crystalline procaine penicillin in a solution containing urea or a water soluble alkyl urea.

Illustratively, the process essentially comprises the preparation of a suspension of crystalline procaine penicillin (about 0.3% w./v.) in a solution containing urea (about 14% w./v.), adding thereto simultaneously, with constant agitation and in increments, an aqueous solution of urea (about 12% w./v.) and crystalline potassium penicillin (about 32% w./v.), and an aqueous solution of urea (about 12% w./v.) and procaine hydrochloride (about 29% w./v.), collecting the resulting solid material on a filter, washing with water, and drying. By "incremental addition" is meant gradual addition, either batchwise or continuously.

Alternatively, a process may be used which essentially comprises the simultaneous, incremental addition of an aqueous solution of an alkali metal penicillin and an aqueous solution of a procaine acid-addition salt to a suspension of crystalline procaine penicillin in a solution containing urea or a water soluble alkyl urea, the concentration of said urea being substantially maintained by simultaneous, incremental addition of an aqueous solution of urea or a water-soluble alkyl urea to said suspension.

Illustratively, such process essentially comprises the preparation of a suspension of crystalline procaine penicillin (about 0.3% w./v.) in a solution containing urea (about 14% w./v.), adding thereto simultaneously, with constant agitation and in increments, an aqueous solution of crystalline potassium penicillin (about 43% w./v.), an aqueous solution of procaine hydrochloride (about 40% w./v.) and an aqueous solution of urea (about 36% w./v.), collecting the resulting solid material on a filter, washing with water, and drying.

Still another manner of carrying out the process of this invention essentially comprises the simultaneous, incremental addition of an aqueous solution of an alkali metal penicillin and an aqueous solution of a procaine acid-addition salt, either of which may contain therein urea or a water soluble alkyl urea, to a suspension of crystalline procaine penicillin containing urea or a water soluble alkyl urea.

The size of the crystals may be altered as desired by varying the following, the change in size being in the direction to be expected from such variation:

(1) The concentration of the potassium penicillin,
(2) The concentration of the procaine hydrochloride,
(3) The concentration of the urea,
(4) The temperature of the mixing,
(5) The size of the seed particles, and/or
(6) The rate at which the solutions are combined.

It is, therefore, the object of this invention to provide a simple, easy and accurately controllable process for obtaining crystals of procaine penicillin of optimal form and size for use in animal feeds which essentially comprises the simultaneous, incremental addition of (I) an aqueous solution of an alkali metal penicillin and (II) an aqueous solution of a procaine acid-addition salt to (III) a suspension of crystalline procaine penicillin in water including urea or a water soluble alkyl urea, and maintaining in the suspension substantially the same concentration of the urea during the incremental addition.

The following examples are illustrative, but not limitative, of the invention (all reactions being carried out at room temperature, about 18–25° C.).

*Example I*

Dissolve 37.5 kg. of urea and 104 kg. of potassium penicillin in 250 liters of water; dissolve 37.5 kg. of urea and 83.2 kg. procaine hydrochloride in 250 liters of water; dissolve 41.5 kg. of urea in 273 liters of water and suspend 832 gm. crystalline, unground procaine penicillin therein.

Simultaneously, at 3.8 liters per minute, with constant agitation, add the potassium penicillin solution and the procaine hydrochloride solution to the procaine penicillin suspension.

After addition of the solutions has been completed, stir for 20 minutes and collect the crystals on a filter. Wash the crystals with deionized water until the conductivity of the wash is less than $5 \times 10^{-5}$ reciprocal ohms.

Transfer the crystals of procaine penicillin to a rotary vacuum dryer. Drying at 45–50° C. in vacuum for 10 hours yields about 150 kg. of crystalline procaine penicillin not more than 10% of which remains on a 40 mesh screen nor more than 50% of which passes through a 100 mesh screen.

*Example II*

To a suspension of 0.6 gm. of crystalline procaine penicillin in a solution of 30 gm. of diethylurea in 180 ml. of water add simultaneously, at 15 ml. per minute, a solution of 60 mg. of procaine hydrochloride and 27 gm. of diethylurea in 180 ml. of water and a solution of 75 mg. of potassium penicillin and 27 mg. of diethylurea in 180 ml. of water. After stirring for a short time, collect the crystals on a filter, wash with water until the conductivity of the wash does not exceed $5 \times 10^{-5}$ reciprocal ohms, and then dry at 45–50° C. in a vacuum oven.

*Example III*

Dissolve 104 kg. of potassium penicillin in 167 liters of water; dissolve 83.2 kg. procaine hydrochloride in 167 liters of water; dissolve 75 kg. of urea in 167 liters of water; dissolve 41.5 kg. of urea in 273 liters of water and suspend 832 mg. crystalline procaine penicillin therein.

Simultaneously, at 2.5 liters per minute, with constant agitation, add the urea solution, the potassium penicillin solution and the procaine hydrochloride solution to the procaine penicillin suspension.

After addition of the solutions has been completed, stir for 20 minutes and collect the crystals on a filter. Wash the crystals with deionized water until the conductivity of the wash is less than $5 \times 10^{-5}$ reciprocal ohms then dry at 45–50° C. in a vacuum oven.

*Example IV*

Dissolve 104 kg. of potassium penicillin in 250 liters of water; dissolve 83.2 kg. procaine hydrochloride and 75 kg. urea in 250 liters of water; dissolve 41.5 kg. of urea in 273 liters of water and suspend 832 mg. crystalline procaine penicillin therein.

Simultaneously, at 3.8 liters per minute, with constant agitation, add the potassium penicillin and procaine hydrochloride solutions to the procaine penicillin suspension.

After addition of the solutions has been completed, stir for 20 minutes and collect the crystals on a filter. Wash the crystals with deionized water until the conductivity of the wash is less than $5 \times 10^{-5}$ reciprocal ohms and dry at 45°–50° C. in a vacuum oven.

*Example V*

Dissolve 104 kg. of potassium penicillin and 75 kg. urea in 250 liters of water; dissolve 83.2 kg. procaine hydrochloride in 250 liters of water; dissolve 41.5 kg. of urea in 273 liters of water and suspend 832 mg. crystalline procaine penicillin therein.

Simultaneously at 3.8 liters per minute, with constant agitation, add the potassium penicillin procaine hydrochloride solutions to the procaine penicillin suspension.

After addition of the solutions has been completed, stir for 20 minutes and collect the crystals on a filter. Wash the crystals with deionized water until the conductivity of the wash is less than $5 \times 10^{-5}$ reciprocal ohms; then dry at 45°–50° C. in a vacuum oven.

Other highly water-soluble alkyl substituted ureas that may be used in lieu of urea and/or diethylurea include, inter alia, dimethylurea, methylurea and ethylurea.

The invention may be variously otherwise embodied within the scope of the appended claims.

I claim:
1. In the preparation of crystalline procaine penicillin for use in animal feeds which essentially comprises the simultaneous, incremental addition of (I) an aqueous solution of an alkali metal penicillin and (II) an aqueous solution of a procaine acid-addition salt to (III) a suspension of crystalline procaine penicillin in water, the improvement which comprises including (IV) a component of the class consisting of urea and water soluble alkyl ureas in a range of about 5% to about 25% in the suspension III, and maintaining in said suspension substantially the same concentration of the component IV during the incremental addition.
2. The process of claim 1 wherein I is an aqueous solution of potassium penicillin and II is an aqueous solution of procaine hydrochloride.
3. The process of claim 2 wherein IV is urea.
4. The process of claim 2 wherein IV is a water soluble alkyl urea.
5. The process of claim 4 wherein IV is diethylurea.

References Cited in the file of this patent

UNITED STATES PATENTS

| | | |
|---|---|---|
| 2,445,478 | Foster et al. | July 20, 1948 |
| 2,515,898 | Rhodehamel | July 18, 1950 |
| 2,676,961 | Ruskin | Apr. 27, 1954 |
| 2,727,892 | Umbdenstock | Dec. 20, 1955 |

FOREIGN PATENTS

| | | |
|---|---|---|
| 661,358 | Great Britain | Nov. 21, 1951 |
| 730,249 | Great Britain | May 18, 1955 |

OTHER REFERENCES

Chem. Abstracts, vol. 42, page 2832g (1948).